United States Patent
Schweiher et al.

(10) Patent No.: US 9,045,034 B2
(45) Date of Patent: Jun. 2, 2015

(54) HYBRID DRIVE TRAIN

(75) Inventors: Mark Schweiher, Lauffen (DE); Birgit Reindt, Erligheim (DE); Torsten Kramm, Ilsfeld (DE)

(73) Assignee: GETRAG Getriebi-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 600 days.

(21) Appl. No.: 13/414,521

(22) Filed: Mar. 7, 2012

(65) Prior Publication Data
US 2012/0227394 A1    Sep. 13, 2012

(30) Foreign Application Priority Data

Mar. 8, 2011  (DE) .......................... 10 2011 013 891
May 26, 2011  (DE) .......................... 10 2011 102 789

(51) Int. Cl.
*B60K 6/48*    (2007.10)
*F16D 48/06*   (2006.01)
*F16H 61/00*   (2006.01)
(Continued)

(52) U.S. Cl.
CPC ............ *B60K 6/48* (2013.01); *B60K 2006/264* (2013.01); *B60K 2006/4808* (2013.01); *F16D 48/066* (2013.01); *F16H 61/0028* (2013.01); *Y02T 10/6221* (2013.01); *Y02T 10/626* (2013.01);
(Continued)

(58) Field of Classification Search
CPC ............ B60K 6/48; B60K 2006/4808; B60K 2006/264; F16D 48/02; F16D 48/066; F16D 2048/0245; F16D 2500/1066; F16H 61/0028; Y02T 10/626; Y02T 10/6221

USPC .......................................... 60/486, 488; 475/5
See application file for complete search history.

(56) References Cited

U.S. PATENT DOCUMENTS 6,575,865 B2 *  6/2003  Takenaka et al. ................ 475/5
6,863,140 B2 *  3/2005  Noreikat et al. ................. 475/5
(Continued)

FOREIGN PATENT DOCUMENTS

DE        101 60 466 C1     6/2003
DE        43 42 233 B4      3/2004
(Continued)

OTHER PUBLICATIONS

European Search Report; Application No. EP 12 15 7905; Aug. 31, 2012.
(Continued)

*Primary Examiner* — Thomas E Lazo
(74) *Attorney, Agent, or Firm* — Knobbe Martens Olson & Bear, LLP

(57) ABSTRACT

A drive train for a motor vehicle has an internal combustion engine and a hydraulically shiftable transmission unit. The input of the transmission can be connected via a clutch arrangement to a crankshaft of the internal combustion engine. The output of the transmission can be connected to driven wheels of the motor vehicle. The crankshaft is connected to a pump shaft which drives a pump arrangement for a hydraulic arrangement, by means of which the transmission unit is shifted and/or lubricated. The pump shaft is connected to an electric machine. The pump shaft is connected to the crankshaft via a constrained motion mechanism. The electric machine is arranged in the axial direction between the constrained motion mechanism and a pump of the pump arrangement.

25 Claims, 2 Drawing Sheets

(51) Int. Cl.
*B60K 6/26* (2007.10)
*F16D 48/02* (2006.01)

(52) U.S. Cl.
CPC ........ *F16D 2048/0245* (2013.01); *F16D 48/02* (2013.01); *F16D 2500/1066* (2013.01)

(56) References Cited

U.S. PATENT DOCUMENTS

| | | | |
|---|---|---|---|
| 8,388,493 B2* | 3/2013 | Henneken et al. | 477/5 |
| 8,485,929 B2* | 7/2013 | Wust | 475/5 |
| 8,494,730 B2* | 7/2013 | Yoshikawa | 701/51 |
| 8,646,313 B2* | 2/2014 | Gale et al. | 73/37 |
| 2008/0108469 A1 | 5/2008 | Weinschenker et al. | |
| 2008/0164115 A1 | 7/2008 | Grethel | |
| 2009/0095548 A1 | 4/2009 | Tamba et al. | |
| 2009/0280941 A1* | 11/2009 | Dusenberry et al. | 475/5 |
| 2010/0031910 A1* | 2/2010 | Seufert et al. | 477/181 |

FOREIGN PATENT DOCUMENTS

| | | |
|---|---|---|
| DE | 102 51 042 A1 | 5/2004 |
| DE | 103 29 215 A1 | 1/2005 |
| DE | 103 29 218 A1 | 1/2005 |
| DE | 10 2004 036 505 A1 | 3/2006 |
| DE | 10 2006 030 040 A1 | 5/2008 |
| DE | 10 2007 012 716 A1 | 9/2008 |
| DE | 10 2007 043 737 A1 | 3/2009 |
| DE | 10 2010 002 014 A1 | 8/2011 |

OTHER PUBLICATIONS

Search Report from German Application No. 10 2011 102 789.4, dated Nov. 25, 2011 in 3 pages.

* cited by examiner

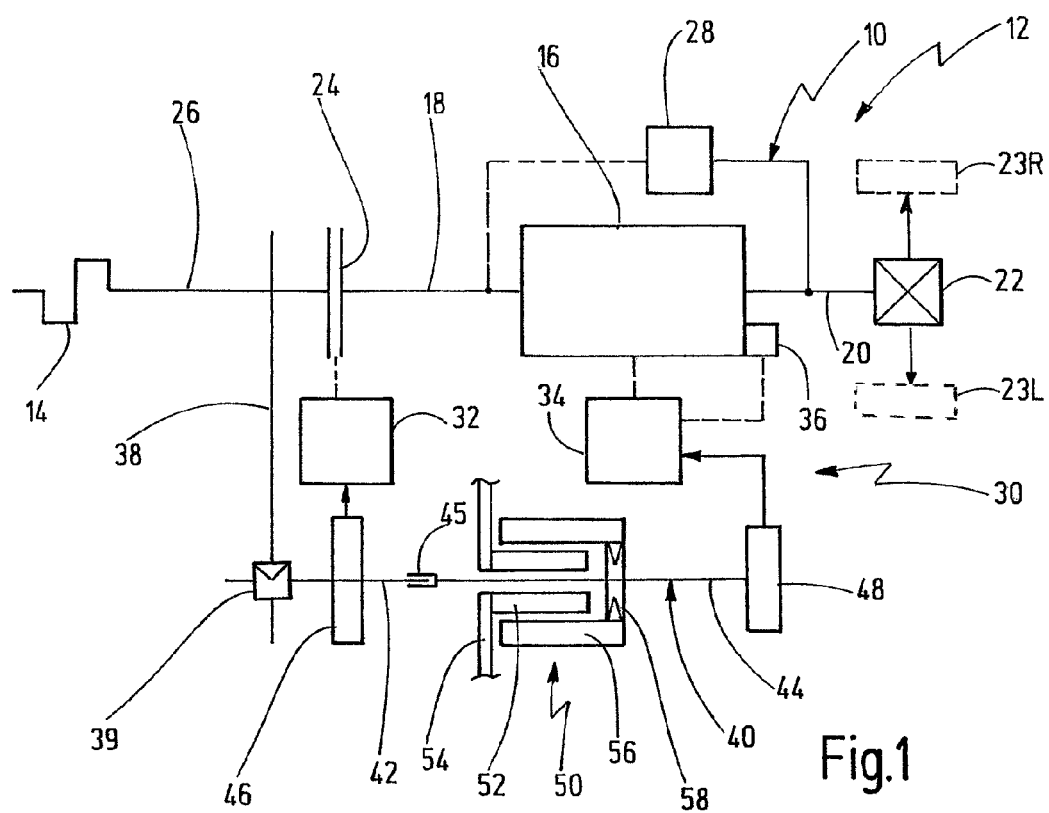
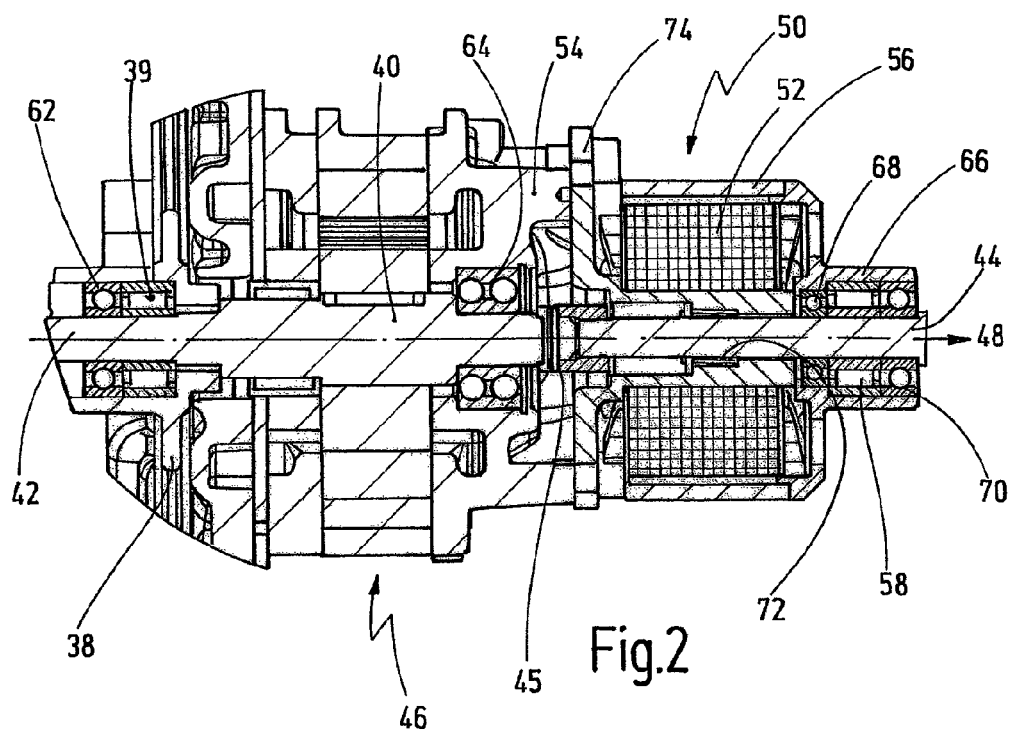

HYBRID DRIVE TRAIN

CROSS REFERENCES TO RELATED APPLICATIONS

This application claims the priorities of German patent application 10 2011 013 891.9 filed on Mar. 8, 2011 and German patent application 10 2011 102 789.4 filed on May 26, 2011. The entire contents of these priority applications are incorporated herein by reference.

BACKGROUND OF THE INVENTION

The present invention relates to a drive train for a motor vehicle, having an internal combustion engine and a hydraulically shiftable transmission unit, the input of which can be connected via a clutch arrangement to a crankshaft of the internal combustion engine and the output of which can be connected to driven wheels of the motor vehicle, the crankshaft being connected, furthermore, to a pump shaft which drives a pump arrangement for a hydraulic arrangement, by means of which the transmission unit is shifted and/or lubricated, and the pump shaft being connected, furthermore, to an electric machine.

A drive train of this general type is known from document DE 43 42 233 B4.

This document discloses an oil-pump drive device having an electric motor which can be connected via a first one-way clutch to a drive shaft of an oil pump, and having a machine which can be connected via a second one-way clutch to the drive shaft of the oil pump, the type of connection depending on the rotational speed of the output shaft of the machine.

Further arrangements for driving transmission oil pumps are known from documents DE 103 29 215 A1 and DE 102 51 042 A1.

In the drive train which is mentioned in the introduction, the electric machine can serve, for example, to drive the pump arrangement for the hydraulic arrangement when the internal combustion engine is not running, for example during start/stop operation of the motor vehicle. In this case, it is possible, for example, to supply the transmission unit with lubricating oil via the pump arrangement which is driven in this way.

The oil-pump drive device which is disclosed in document DE 43 42 233 B4 has a relatively complex construction, since the electric machine is to be connected to the pump shaft from outside a housing of the transmission unit.

SUMMARY OF THE INVENTION

Against the above background, it is an object of the invention to specify an improved drive train for a motor vehicle.

According to a first aspect of the present invention, this object is achieved in the drive train which is mentioned in the introduction by virtue of the fact that the pump shaft is connected to the crankshaft via a constrained motion mechanism, the electric machine being arranged in the axial direction between the constrained motion mechanism and a pump arrangement.

In this embodiment, the electric machine can be integrated into the drive train in a structurally simple manner. In particular, the electric machine can be arranged within a housing of the transmission unit.

The electric machine is preferably configured as a brushless electric machine, in particular as a permanently excited DC machine. Furthermore, it is preferred if the electric machine is combined with a sensorless actuating logic unit, for example via what is known as the back EMF method.

According to a second aspect of the invention, the above object is achieved in the drive train which is mentioned in the introduction by virtue of the fact that the electric machine is arranged coaxially with respect to the pump shaft.

As a result, it is possible firstly to provide a radially compact arrangement. It is preferred here if the electric machine is configured as what is known as a torque motor, by way of which a relatively high torque can be generated, with the result that it is not necessary to drive the pump shaft via a gear ratio.

According to a third aspect of the present invention, the above object is achieved in the drive train which is mentioned in the introduction by virtue of the fact that the pump arrangement has a first pump which is connected to a first hydraulic system for the clutch arrangement and a second pump which is connected to a second hydraulic system for the transmission unit.

This preferred embodiment makes it possible to use the electric machine to drive not only a hydraulic system for the transmission unit, but rather also a hydraulic system for the clutch arrangement. Here, the hydraulic system for the clutch arrangement can be designed for relatively high pressures, since the hydraulic system is preferably designed for closing and for opening the clutch arrangement.

It is particularly advantageous here if the electric machine is arranged in the axial direction between the first pump and the second pump.

As a result, an axially compact design can be realized. Furthermore, high modularity is provided by this design, since the electric machine has to be installed only in drive trains of the type in which this is necessary. An electric machine of this type is optionally not necessary in other types of drive trains, in which, for example, the transmission unit is actuated electromechanically.

Overall, it is preferred, furthermore, if the crankshaft is connected to the pump shaft via a first freewheel.

If the pump shaft is driven by electric motor, it can be avoided as a result that the internal combustion engine is also moved in a coupled manner.

It is preferred in a corresponding way if the electric machine is connected to the pump shaft via a second freewheel.

As a result, it is possible to drive the pump shaft by internal combustion engine, without a rotor of the electric machine also being moved in a coupled manner.

According to a fourth aspect of the present invention, the above object is achieved in the drive train which is mentioned in the introduction by virtue of the fact that the drive train is configured as a hybrid drive train which has an electric drive machine for driving the motor vehicle.

Here, the electric drive machine is preferably attached to the drive train in such a way that driving operation purely by electric motor is possible.

In this embodiment, the lubrication of gear sets of the transmission unit and/or the actuation of clutches of the transmission unit can take place independently of the operation of the internal combustion engine even when drive purely by electric motor is set up.

It is particularly preferred here if the electric drive machine is connected to the output of the transmission unit.

As a result, firstly the electric drive machine can be attached to the drive train simply. Since electric machines operate over a large rotational speed range, it is not absolutely necessary to connect the electric drive machine to the input of the transmission unit.

Since the peculiarity occurs in this embodiment that the transmission input is at a standstill during electric driving operation, the problem arises that a lubrication of the transmission is possible only via an electric machine which is connected to the pump shaft.

The electric machine can be configured structurally in different ways. For example, the electric machine can be configured in a shrunk-on-disc rotor design.

According to one preferred embodiment, the electric machine is configured as an internal-rotor machine.

Here, the arrangement of the rotor can be shielded satisfactorily with respect to the surroundings.

According to an alternative preferred embodiment, the electric machine is configured as an external-rotor machine.

The drive train can be set up as a drive train with an automated change-speed transmission or with a manual change-speed transmission, but is preferably configured as a dual clutch transmission.

Overall, it is preferably achieved that, in a drive train of the type denoted above, extended functionalities of the transmission in the electric drive mode, in particular shifting operations in the transmission unit, are made possible by the additional driving of the pump arrangement by means of an electric machine. The drive of a gear oil pump can also be integrated.

As a result of the pump shaft which is driven by electric motor, it is also possible, for example, to actuate a parking lock of the transmission unit, which parking lock can be unlocked hydraulically, even if the internal combustion engine is not in operation. A change of the hydraulic transmission actuator system is not then necessary.

The additional drive by means of the electric machine can ensure the hydraulic pressure supply, in order that at least some functionalities of the hydraulically shiftable transmission unit are also possible in electric driving operation, in particular downshifts into lower gears, in order to make the next driving-off operation with the internal combustion engine possible, more comfortable starting of the internal combustion engine by closing the clutch arrangement, etc.

Furthermore, the lubricating-oil supply of the gear sets of the transmission unit can also be undertaken as a result. To this extent, the transmission unit does not have to be modified with respect to other drive trains, in which electric driving operation is not set up.

Furthermore, it is possible to augment conventional drive trains with an additional electric-motor drive of this type for the pump shaft, to be precise in the context of an existing transmission package. This results in identical transmission performance during internal combustion engine operation. High additional functionality is provided with few additional components.

The lubrication of gear sets of the transmission unit can take place, furthermore, by an independent electric pump which can therefore be set according to requirements and can improve the degree of efficiency of the overall system. In this case, the electric machine would only drive a pump for shifting the transmission unit.

Any two, three, or four of the above four aspects of the invention can be combined with each other.

It goes without saying that the features which are mentioned in the above text and those which are still to be explained in the following text can be used not only in the respectively specified combination, but rather also in other combinations or on their own, without departing from the scope of the present invention.

BRIEF DESCRIPTION OF THE DRAWINGS

Exemplary embodiments of the invention are shown in the drawing and will be explained in greater detail in the following description. In the drawing:

FIG. 1 diagrammatically shows a first embodiment of a drive train according to the invention, FIG. 2 shows a partial sectional view of a pump shaft with an electric machine, as can be used in the drive train of FIG. 1.

DESCRIPTION OF PREFERRED EMBODIMENTS

Figure 3:
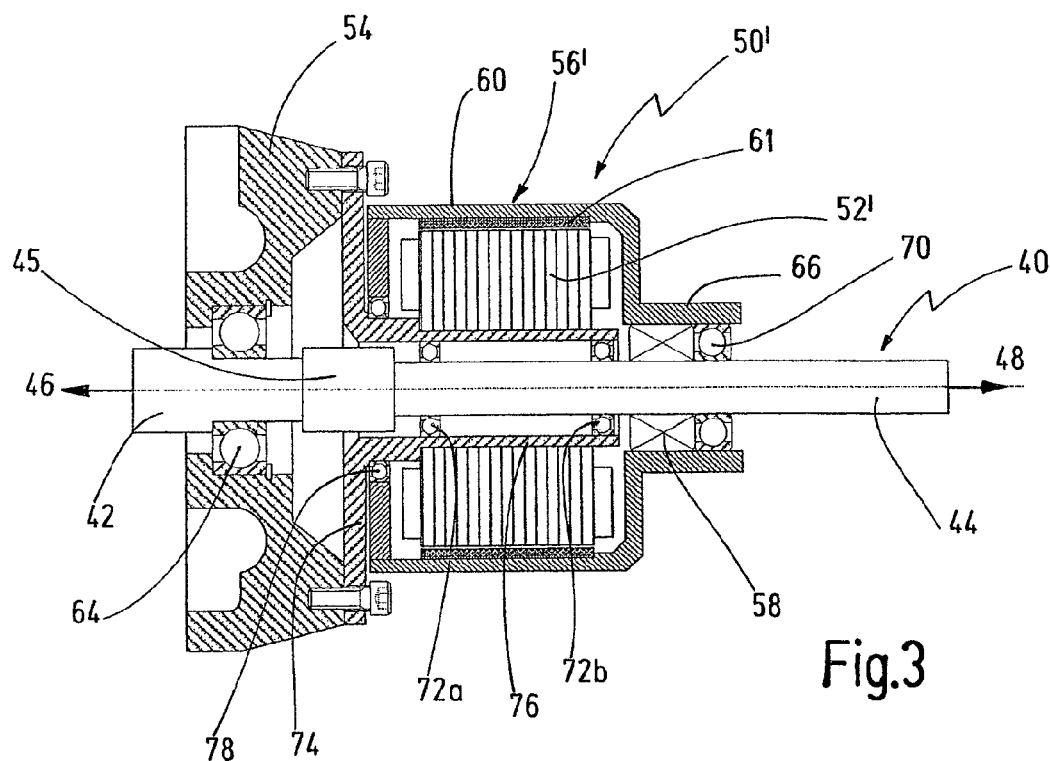
FIG. 3 shows a partial sectional view of a further embodiment of a pump shaft with an electric machine of external-rotor design.

In FIG. 1 a drive train is denoted generally by 10, which drive train serves to drive a diagrammatically shown motor vehicle 12.

The drive train has an internal combustion engine 14 and a hydraulically shiftable transmission unit 16. The transmission unit 16 can be configured, for example, as a multi-step transmission of counter-shaft design. It can be a single transmission or the two component transmissions of a dual clutch transmission. The transmission unit 16 has an input 18 and an output 20. The output 20 is connected via a differential gear mechanism 22 to driven wheels 23L, 23R of the motor vehicle 12.

Furthermore, the drive train 10 has a clutch arrangement 24 which connects the input 18 of the transmission unit 16 to a crankshaft 26 of the internal combustion engine 14. The clutch arrangement 24 can be a single wet-running or dry friction clutch which can be automatically operated, for example, so as to slip. In the case of the integration of a dual clutch transmission, the clutch arrangement 24 can also be a dual clutch arrangement, with the result that the input 18 of the transmission unit 16 has two shafts.

Furthermore, 28 indicates an electric drive machine which is connected to the output 20 of the transmission unit 16. As an alternative, the electric drive machine 28 can also be connected to the input 18 of the transmission unit 16, as is shown using dashed lines.

In the drive train 10, it is firstly possible to drive the motor vehicle 12 purely by internal combustion engine, the clutch arrangement 24 being closed and a gear stage being engaged in the transmission unit 16. Furthermore, it is possible to drive the motor vehicle 12 purely by electric motor if, for example, the friction clutch arrangement 24 is open and the electric drive machine 28 transmits a drive moment to the output 20 of the transmission unit 16. Here, a gear stage can be engaged in the transmission unit 16 or else not. It is preferable that no gear stage is engaged, in order to avoid unnecessary masses also being moved in a coupled manner.

If the electric drive machine 28 is connected to the input 18 of the transmission unit 16, the friction clutch arrangement 24 is likewise open during operation purely by electric motor, but a gear stage is engaged in the transmission unit 16.

Furthermore, the drive train 10 has a hydraulic arrangement 30 which has a first hydraulic system 32 and a second hydraulic system 34. The first hydraulic system 32 serves to actuate the friction clutch arrangement 24. The second hydraulic system 34 serves firstly to actuate clutches of the transmission unit 16 and to lubricate gear sets of the transmission unit 16. Furthermore, the second hydraulic system 34 can also serve to engage and disengage a parking lock arrangement 36.

It is also possible in general that the first hydraulic system 32 is designed for actuating the clutches of the transmission unit 16 and/or the parking lock arrangement 36. In this case, the second hydraulic system 34 serves solely for lubricating the gear sets of the transmission unit 16.

The crankshaft 26 (or the input 18 of the transmission unit 16) is connected via a first freewheel 39 to a pump shaft 40 via a constrained motion mechanism 38 such as a constant gear set, a friction wheel set, a toothed belt drive or chain drive. When the internal combustion engine 14 is in operation, the pump shaft 40 is driven via the freewheel 39.

When, in contrast, the pump shaft 40 is driven in a different way, the internal combustion engine 14 is not moved in a coupled manner.

The pump shaft 40 is divided into a first part shaft 42 and a second part shaft 44 which are connected fixedly to one another so as to rotate together via a diagrammatically shown plug-in connection 45.

The first part shaft 42 is connected to an output of the first freewheel 39. A first pump 46 for supplying the first hydraulic system 32 is arranged on the first part shaft 42 and/or is driven by the latter. The first pump is preferably arranged concentrically with respect to the first part shaft 42.

Furthermore, a second pump 48 is arranged on the second part shaft 44 and/or is driven by the latter. The second pump 48 is preferably likewise arranged concentrically with respect to the second part shaft 44 and serves to supply the second hydraulic system 34 with fluid.

An electric machine 50 is arranged concentrically with respect to the pump shaft 40 in the region between the two pumps 46, 48. The electric machine 50 has a stator 52 which is for example configured as an internal stator and is connected rigidly to a housing 54 (for example, a transmission housing).

Furthermore, the electric machine 50 has a rotor 56 which is configured for example as an external rotor and is connected via a second freewheel 58 to the pump shaft 40, more precisely the second part shaft 44.

Here, the electric machine 50 is preferably arranged on the second part shaft 44.

In the case of drive purely by electric motor, by means of the electric drive machine 28, the friction clutch 24 is as a rule open and the internal combustion engine 14 is at a standstill. In this case, the electric machine 50 is actuated as a motor for driving the pump shaft 40. Here, moving of the internal combustion engine 14 in a coupled manner is prevented on account of the freewheel 39. If, on the contrary, the drive train 10 sets up driving operation by internal combustion engine, the pump shaft 40 is driven by means of the internal combustion engine 14 via the first freewheel 39. Here, the rotor 56 is not moved in a coupled manner, on account of the second freewheel 58.

The embodiment of FIG. 2 shows a detail of a drive train 10 including a pump shaft 40. Here, the general construction and the general method of operation correspond to the arrangement of the pump shaft 40 of FIG. 1. Identical elements are therefore denoted by identical reference numerals. In the following text, substantially the differences and/or refinements will be explained.

A drive gear of the constrained motion mechanism 38 is connected to the first part shaft 42 via the first freewheel 39. Furthermore, the drive gear of the constrained motion mechanism 38 is mounted rotatably on the first part shaft 42 via a first bearing 62.

At its other end, in the region of the plug-in connection 45, the first part shaft 42 is mounted rotatably on a housing 54 by means of a second bearing 64. The rotor 56 has a bearing sleeve 66 which points in the direction away from the constrained motion mechanism 38 and by means of which the external rotor 56 is mounted rotatably on the second part shaft 44 via a third bearing 68 and a fourth bearing 70. Here, the second freewheel 58 is arranged between the third bearing 68 and the fourth bearing 70.

The stator 52 which is fixed on the housing 54 is mounted rotatably on the second part shaft 44 via a fifth bearing (for example, a needle bearing). Furthermore, on that side of the electric machine 50 which faces the constrained motion mechanism 38, the stator 52 is connected to a radially extending stator carrier 74, by means of which the stator 52 is fixed on the housing 54.

Furthermore, it is shown that the first pump 46 is arranged on the first part shaft 42 in the region between the constrained motion mechanism 38 and the second bearing 64. The plug-in connection 45 is arranged in the axial direction approximately between the second bearing 64 and the electric machine 50.

Figure 4:
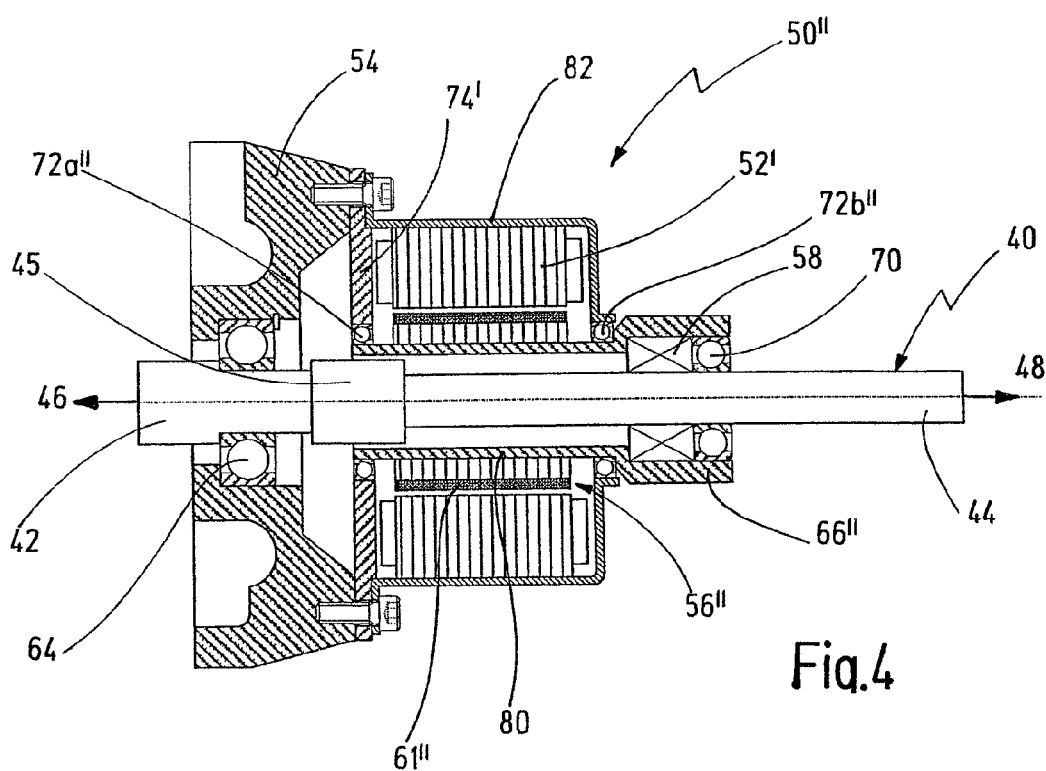
FIG. 4 shows a partial sectional view of a pump shaft with an electric machine of internal-rotor design.

The following FIGS. 3 and 4 show two alternative embodiments of electric machines 50' and 50" which can be connected in each case to a pump shaft 40, as is shown in FIG. 2, for example.

Just like the electric machine 50 of FIG. 2, the electric machine 50' which is shown in FIG. 3 is configured as an external-rotor machine. The general construction and the method of operation are generally identical to those in the embodiment of FIG. 2. Identical elements are therefore provided with identical reference numerals. Substantially the differences will be explained in the following text. For instance, in the electric machine 50' of FIG. 3, the rotor 56' is fixed on a rotor drum 60 which has the bearing sleeve 66. Permanent magnets 61 of the rotor 56' are fixed on the rotor drum 60. The rotor drum 60 is mounted in the region of the bearing sleeve by means of an individual bearing (fourth bearing 70) which is axially adjacent to the second freewheel 58. Furthermore, adjacently to the housing 54, the rotor drum 60 is mounted radially on the stator carrier 74, to be precise by means of a sixth bearing 78.

The second part shaft 44 is mounted radially within a carrier sleeve 76 of the stator carrier 74 by means of two fifth bearings 72a, 72b, the carrier sleeve 76 being a sleeve-shaped extension of the stator carrier 74.

FIG. 4 shows an electric machine 50" of internal-rotor design. With regard to the construction and function, said electric machine 50" corresponds generally to the above-described figures. Identical elements are therefore provided with identical reference numerals. Substantially the differences will be explained in the following text.

For instance, a rotor shaft 80 is arranged coaxially with respect to the pump shaft 40 and is mounted firstly by means of a bearing 72a" on a stator carrier 74' and secondly by means of a further bearing 72b" on a stator housing 82 which is connected to the stator carrier 74'. The bearing sleeve 66" is connected to the rotor shaft 80 and extends in the axial direction out of the stator housing 82. As a result, a radially compact design can be achieved, in particular when the bearing sleeve 66" has a greater external diameter than the rotor shaft 80.

What is claimed is:

1. Drive train for a motor vehicle, having an internal combustion engine and a hydraulically shiftable transmission unit, an input of which can be connected via a clutch arrangement to a crankshaft of the internal combustion engine and an output of which can be connected to driven wheels of the motor vehicle, the crankshaft being connected, furthermore, to a pump shaft which drives a pump arrangement for a hydraulic arrangement, by means of which the transmission unit is at least one of shifted and lubricated, the pump shaft being connected, furthermore, to an electric machine, the pump shaft being connected to the crankshaft via a constrained motion mechanism, the electric machine being arranged in an axial direction between the constrained motion mechanism and a pump of the pump arrangement, wherein the pump arrangement has a first pump which is connected to a first hydraulic system for the clutch arrangement and a second pump which is connected to a second hydraulic system for the transmission unit, and wherein the electric machine is arranged in the axial direction between the first pump and the second pump.

2. Drive train according to claim 1, wherein the electric machine is arranged coaxially with respect to the pump shaft.

3. Drive train according to claim 1, wherein the crankshaft is connected to the pump shaft via a first freewheel.

4. Drive train according to claim 1, wherein the electric machine is connected to the pump shaft via a second freewheel.

5. Drive train according to claim 1, wherein the drive train is configured as a hybrid drive train which has an electric drive machine for driving the motor vehicle.

6. Drive train according to claim 5, wherein the electric drive machine is connected to the output of the transmission unit.

7. Drive train according to claim 1, wherein the electric machine is configured as an internal-rotor machine.

8. Drive train according to claim 1, wherein the electric machine is configured as an external-rotor machine.

9. Drive train for a motor vehicle, having an internal combustion engine and a hydraulically shiftable transmission unit, an input of which can be connected via a clutch arrangement to a crankshaft of the internal combustion engine and an output of which can be connected to driven wheels of the motor vehicle, the crankshaft being connected, furthermore, to a pump shaft which drives a pump arrangement for a hydraulic arrangement, by means of which the transmission unit is at least one of shifted and lubricated, the pump shaft being connected, furthermore, to an electric machine, wherein the pump shaft is connected to the crankshaft via a constrained motion mechanism, the electric machine being arranged in an axial direction between the constrained motion mechanism and a pump of the pump arrangement.

10. Drive train according to claim 9, wherein the electric machine is arranged coaxially with respect to the pump shaft.

11. Drive train according to claim 9, wherein the pump arrangement has a first pump which is connected to a first hydraulic system for the clutch arrangement and a second pump which is connected to a second hydraulic system for the transmission unit.

12. Drive train according to claim 11, wherein the electric machine is arranged in the axial direction between the first pump and the second pump.

13. Drive train according to claim 9, wherein the crankshaft is connected to the pump shaft via a first freewheel.

14. Drive train according to claim 9, wherein the electric machine is connected to the pump shaft via a second freewheel.

15. Drive train according to claim 9, wherein the drive train is configured as a hybrid drive train which has an electric drive machine for driving the motor vehicle.

16. Drive train according to claim 15, wherein the electric drive machine is connected to the output of the transmission unit.

17. Drive train for a motor vehicle, having an internal combustion engine and a hydraulically shiftable transmission unit, an input of which can be connected via a clutch arrangement to a crankshaft of the internal combustion engine and an output of which can be connected to driven wheels of the motor vehicle, the crankshaft being connected, furthermore, to a pump shaft which drives a pump arrangement for a hydraulic arrangement, by means of which the transmission unit is at least one of shifted and lubricated, the pump shaft being connected, furthermore, to an electric machine, wherein the pump arrangement has a first pump which is connected to a first hydraulic system for the clutch arrangement and a second pump which is connected to a second hydraulic system for the transmission unit.

18. The drive train of claim 17, wherein the electric machine is arranged coaxially with respect to the pump shaft.

19. Drive train according to claim 17, wherein the electric machine is arranged in an axial direction between the first pump and the second pump.

20. Drive train according to claim 17, wherein the crankshaft is connected to the pump shaft via a first freewheel.

21. Drive train according to claim 17, wherein the electric machine is connected to the pump shaft via a second freewheel.

22. The drive train of claim 17, wherein the drive train is configured as a hybrid drive train which has an electric drive machine for driving the motor vehicle.

23. Drive train according to claim 22, wherein the electric drive machine is connected to the output of the transmission unit.

24. Drive train according to claim 22, wherein the electric machine is configured as an internal-rotor machine.

25. Drive train according to claim 22, wherein the electric machine is configured as an external-rotor machine.

* * * * *